May 1, 1928.
C. G. OLSON
1,668,025
LOCK WASHER
Filed Feb. 4, 1927
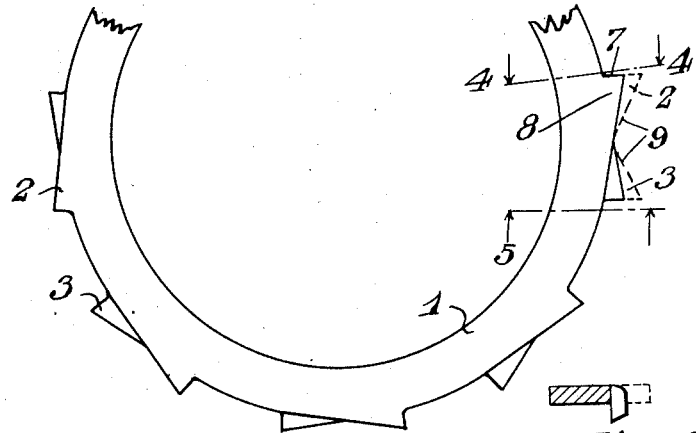
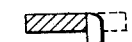
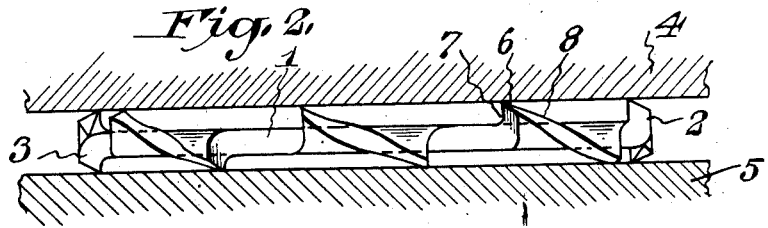
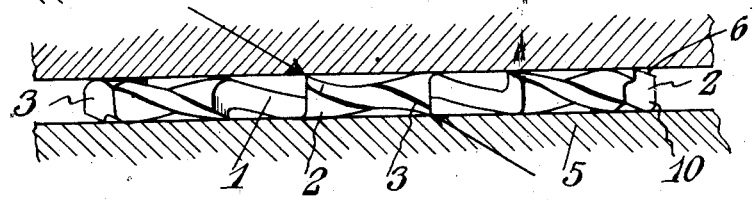
INVENTOR
Carl G. Olson,
BY
George B Willcox
ATTORNEY Patented May 1, 1928.

1,668,025

UNITED STATES PATENT OFFICE.

CARL G. OLSON, OF CHICAGO, ILLINOIS, ASSIGNOR TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

LOCK WASHER.

Application filed February 4, 1927. Serial No. 165,826.

This invention pertains to lock washers of the kind that prevents reverse rotation of a threaded nut or bolt by locking the nut or bolt head to the substructure by the biting action of a number of rigid teeth that project above both surfaces of the washer, the teeth on one surface being disposed intermediate the teeth on the other surface, so that upon compression under the nut or bolt head the washer assumes a corrugated or wavy form.

The improvement over the former art, embodied in my invention, is found in a novel shape and arrangement of the teeth with respect to the body of the washer. The body itself, as usual in washers of the above-mentioned type, is made of an annular ring of spring material, for instance, sheet steel.

An object of my invention is to provide, in a washer of the kind described, teeth that are not struck up or milled from the face of the annular ring itself, as has heretofore been the practice, but instead lie beyond the circular boundaries of the ring, yet are integral with it. The advantage of this tooth arrangement is that the ring and the teeth can be formed from sheet metal by a simple stamping operation, and furthermore the strength and springiness of the ring proper is not impaired, as heretofore, by striking up the teeth from the ring material, or by forcing the projections up from the opposite side of the ring.

Another object is to provide in combination with the annular ring or body of the washer a series of teeth, m le as above described and shaped by bending to afford maximum strength for resisting compression, so that when the washer is compressed its annular body will be sprung out of its normal flat condition into a wavy or corrugated shape. The utilization of oppositely placed, alternating, ratchet biting teeth for springing a flat washer into corrugated form under compression is not, broadly considered, new in this embodiment, but the utilization of biting teeth that are located radially beyond the peripheral boundary of the flat annular ring, the said teeth being formed by bending them alternately in opposite directions out of the plane of the ring so that a compressive load applied simultaneously to the points of all the teeth will spring the ring from flat into wavy corrugated form, is believed to be new in the art.

By this construction the teeth are presented endwise to the compressing surfaces, and will resist enormous stresses without buckling or breaking. Moreover, the compressive loading of the teeth is resisted by the full strength of the washer body to resist bending, whereas in former constructions, in which the teeth extended across the face of the ring, the spring-strength of the washer body was weakened by the act of forming the teeth from the material of the ring proper.

With the foregoing and certain other objects in view, which will appear later in the specifications, my invention comprises the devices described and claimed and the equivalents thereof.

In the drawings Fig. 1 is a part plan view of a washer made in accordance with my invention.

Fig. 2 is a side elevation of a washer in position between two bodies, as the base of a nut or bolt head and the substructure, before the final tightening operation.

Fig. 3 is a similar view, showing the form the washer assumes on the final tightening of the nut.

Figs. 4 and 5 are cross sections respectively on lines 4—4 and 5—5 of Fig. 1.

As is clearly shown in the drawings, the annular ring or washer body 1, preferably made by stamping out of spring sheet metal, has on its outer periphery a number of pairs of oppositely directed teeth 2, 3. In Fig. 1 the shape and position of the tooth blanks, in the flat, are designated by dotted lines. A tooth 2 of each pair is bent upwardly substantially at right angles to the plane of the ring, and the other tooth 3 is bent downwardly.

Before being put under compressive stress, the base 4 of a nut or bolt head rests upon the points of the upwardly projecting teeth 2, while the substructure 5 supports the washer on the points of teeth 3. The biting points and edges of all the teeth lie outside the annular space bounded by the inner and outer circles that define the ring proper, yet when the compressive stress is applied to the biting edges of the teeth the body of the spring ring itself is sprung into the corrugated or wavy form shown in Fig. 3.

By this means the full reactionary strength of the ring is utilized to cause the teeth to powerfully bite into the faces of the work, because the ring itself has not been weakened either by punching teeth from its body as in some former constructions, or by forcing up the metal of the ring from the opposite side to form the teeth, as in other earlier constructions.

In my invention the construction of the teeth and their preferred arrangement around the rim of the washer ring possess certain novel features, as follows:

Referring to the tooth blank shown by dotted lines in Fig. 1, it is clear that tooth 2 when bent up at right angles to the plane of the ring, as shown in Fig. 4, has a biting edge 6, an upright front face 7 and a rearwardly sloping reinforcing body 8, and that the complementary tooth 3, also bent at right angles to the body, but from the opposite face of the body, constitutes a reinforcing backing for tooth 2 when the washer is resisting the tendency of the nut to unscrew.

The teeth 2, 3 are preferably arranged in pair as shown, each pair being formed from a single radially extending wing shaped with an angular notch 9 in its outer edge.

When the washer is fully compressed, as shown in Fig. 3, each tooth 2, 3, has its base or heel 10 and its biting edge 6 rigidly engaged between the opposing work faces 4 and 5, while the tendency of the work to unscrew is resisted by compression within the oppositely directed and mutually reinforcing teeth 2 and 3, as indicated by the arrows in Fig. 3. These opposing thrusts are withstood by the teeth themselves. Consequently there is no serious strain brought upon the washer body 1. It is, therefore, free to exert all of its springy or elastic strength, when sprung into the wavy form shown in Fig. 3, in holding the biting edges of the teeth in engagement with the work after some slight unscrewing movement has taken place, or even before the full amount of compression illustrated in Fig. 3 has occurred, that is, before the nut has been solidly screwed to its seat.

By the means above described I have produced a washer that can be made from sheet metal by simple stamping or punch press operation; the body or ring proper is not altered or distorted to make the teeth and consequently retains its full initial spring strength. The teeth, although lying outside the ring are capable of springing it into wavy form under compression, and the shape of the teeth is such that the two teeth of a pair mutually reinforce each other so as to withstand the thrust caused by tendency of the nut to unscrew, and by resisting that thrust the teeth relieve the washer body of that strain, yet all downward load is transmitted directly from the points of the teeth to the washer body to spring it or corrugate it, thereby making available its full spring strength to cause biting reaction at the tooth points.

Having thus described my invention, what I claim and desire to secure by Letters Patent is:

1. A spring lock washer comprising a flat annular ring of spring material, teeth spaced apart in pairs around the periphery of said ring and outside the boundary thereof, a tooth of each pair bent so as to be substantially perpendicular to the plane of the body and to project upwardly out of said plane, the other tooth of each pair oppositely directed and projecting downwardly out of the plane of the body, said pair of teeth adapted, when subjected to compressive load, to spring the body of the washer into slightly corrugated form, for the purposes set forth.

2. A spring lock washer comprising an annular ring of flexible material, a plurality of pairs of teeth spaced around and outside the periphery of said ring, each pair formed from a radially projecting ring portion having an angular notch in its outer edge, the tooth members of said ring bent to project at right angles to the plane of the washer in opposite directions therefrom, for the purposes set forth.

3. A spring lock washer comprising a flat annular ring having biting teeth spaced apart around its periphery, said teeth located radially beyond the peripheral boundary of the ring, individual teeth of each pair bent substantially at a right angle with the plane of said body and projecting in opposite directions therefrom and so disposed that the compressive action of the work upon the oppositely directed teeth causes slight rotation of each pair of teeth and consequent deflection of that part of the ring between adjacent pairs of teeth, for the purposes set forth.

In testimony whereof, I affix my signature.

CARL G. OLSON.